United States Patent Office 3,401,177
Patented Sept. 10, 1968

3,401,177
BENZ[d]INDOLO[3,2-b]THIOPYRYLIUM COMPOUNDS
Thomas E. Young, Bethlehem, Pa., and Peter H. Scott, Guilford, Conn., assignors to Warner-Lambert Pharmaceutical Company, Morris Plains, N.J., a corporation of Delaware
No Drawing. Continuation-in-part of application Ser. No. 459,114, May 26, 1965. This application May 23, 1966, Ser. No. 551,964
2 Claims. (Cl. 260—326.9)

ABSTRACT OF THE DISCLOSURE

This invention relates to compounds of the formula

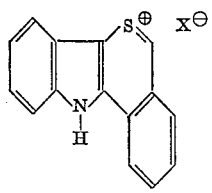

wherein $X^{\ominus}$ is perchlorate or halide, said compounds being useful as antibacterial and antifungal agents.

---

This application is a continuation-in-part of application Ser. No. 459,114, filed May 26, 1965, for Benz[d]indolo [3,2-b]thiopyrylium compounds, now abandoned.

This invention relates to benz[d]indolo[3,2-b]thiopyrylium compounds, and more particularly to a new class of compounds having the following formula:

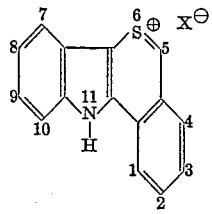

I wherein $X^{\ominus}$ is perchlorate or halide, e.g. chloride, bromide, iodide, or fluoride.

The benz[d]indolo[3,2-b]thiopyrylium compounds of Formula I are useful as antibacterial and antifungal agents, particularly against gram positive bacteria, e.g. *Staphylococcus aureus, Bacillus subtilis*, etc., and fungi, e.g. *Candida albicans, Trichophyton mentagrophytes*, etc.

The compounds of Formula I can be mixed with pharmaceutical adjuvants, and the resulting mixtures formed into salves, ointments and powders for topical and otic applications.

Topical ointment bases that can be employed with the compounds of Formula I are those standards in the pharmaceutical compounding art, e.g. those having a base composed of one or more of the following: animal fats, animal waxes, essential oils, hydrogenated oils, lanolin, olive oil, paraffins, etc. Examples of the above include wool alcohols, wool fat either alone or mixed with lard or paraffin, hydrogenated palm kernel oil, hydrogenated castor oil, etc. Additionally, oil-in-water and water-in-oil bases described in the United States Pharmacopeia can also be used. Hardening agents such as beeswax can be incorporated in the above.

The compounds of Formula I are employed in a therapeutically effective amount in the above ointment bases. They can be applied to the broken or unbroken skin of the animal body, and water soluble bases can also be used for otic application.

Also, a therapeutically effective amount of a compound of Formula I can be used in a talcum powder base for use as a topical dusting powder. What constitutes a therapeutically effective amount of the compounds of Formula I is dependent on various factors such as the particular base employed, the nature and site of the infection, etc. Generally, amounts ranging from about 0.1 to about 5.0%, e.g. about 1%, in the above ointment and powder bases are advantageously employed, although quantities above and below these amounts can also be employed and are within the scope of the instant invention.

The compounds of the present invention are prepared according to the following reaction scheme:

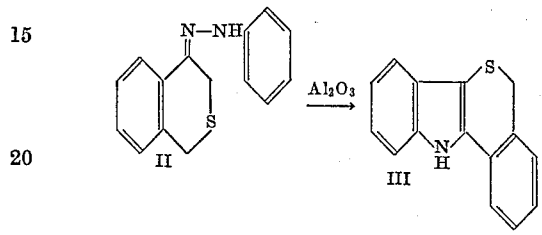

The reaction is carried out by passing isothiochromanone phenylhydrazone (II) dissolved in a suitable solvent such as benzene over active alumina to yield the reaction product 5,11-dihydrobenz[d]indolo[3,2 - b]thiopyran (III). This method offers a considerable improvement over methods known heretofor such as that disclosed by Kiang and Mann in J. Chem. Soc., 1909 (1951). The thiopyran compound (III) is then reacted with a perchlorate such as trityl perchlorate to give the corresponding benz[d]indolo[3,2-b]thiopyrylium compound (I) according to the following reaction scheme:

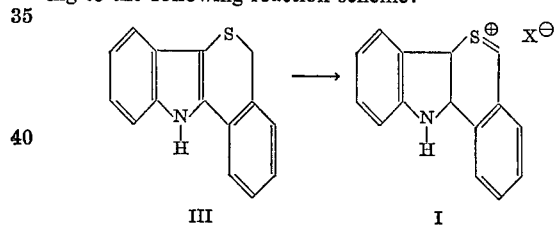

wherein $X^{\ominus}$ is perchlorate. Compounds of Formula I wherein $X^{\ominus}$ is halide may be prepared from the above perchlorate compound by means of ion exchange employing a suitable anion exchange resin such as Dowex AG-1×8.

The practice of the present invention is further illustrated by the following examples:

Example 1.—Benz[d]indolo[3,2-b]thiopyrylium perchlorate

A dropping funnel with a vapor by-pass and a reflux condenser are attached by means of a parallel side-arm adapter to a 100 ml. round bottom flask containing 2.48 g. (0.0104 mole) of indolo[3,2-c]isothiochromene [A. K. Kiang and F. G. Mann, J. Chem. Soc., 1909 (1951); defined as indolo(3':2'-3:4)-2-thioisochromene], 25 ml. of glacial acetic acid, and a magnetic stirring bar. The system is purged with nitrogen and the mixture is heated until solution, after which a solution of 3.60 g. (0.0105 mole) of trityl perchlorate in a minimal volume of nitromethane is added dropwise without further heating. The first few drops of trityl perchlorate solution cause the reaction mixture to become black, consequently obscuring any further change. When the addition is completed, the solution is heated at reflux for 15 minutes and then allowed to cool to room temperature. The precipitate which forms on standing is collected and washed thoroughly with anhydrous ether. The precipitate, having a rust color with a slight golden luster, weighs 3.02 g. (86%).

The M.P. is 247° C. with decomp. On standing, the filtrate affords an additional 0.41 g. (12%) of crude product having a M.P. of 237° with decomp. Recrystallization from glacial acetic acid provides pure benz[d]indolo[3,2-b]thiopyrylium perchlorate as red-brown crystals with a golden metallic luster, M.P. 247° (decomp.).

Analysis.—For $C_{15}H_{10}ClNO_4S$: Calcd.: C, 53.65; H, 3.00; N, 4.18. Found: C, 53.36; H, 3.45; N, 4.24.

Example 2

An ointment is prepared for topical use from the following ingredients:

| | Parts by weight |
|---|---|
| Benz[d]indolo[3,2-b]thiopyrylium perchlorate | 10 |
| Hydrogenated castor oil | 60 |
| Hard paraffin | 160 |
| Soft paraffin | 170 |
| Liquid paraffin | 600 |

The hydrogenated castor oil, hard paraffin, soft paraffin, and liquid paraffin are heated together to form a melt, thoroughly mixed, and the perchlorate, in powder form, added thereto with stirring. The resulting mixture is allowed to cool, and then placed in suitable containers.

It is understood that the foregoing detailed description is given merely by way of illustration and that many variations may be made therein without departing from the spirit of the invention.

What is claimed is:
1. A compound of the formula:

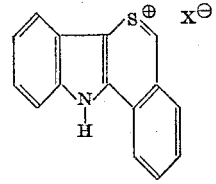

wherein $X^{\ominus}$ is halide or perchlorate.

2. Benz[d]indolo[3,2-b]thiopyrylium perchlorate.

References Cited

Kiang et al.: Jour. Chem. Soc., 1951, pp. 1909–1914.
Luttringhaus et al.: Naturwissenschaften, vol. 44 (1957), pp. 584–85.

NICHOLAS S. RIZZO, *Primary Examiner.*

J. A. NARCAVAGE, *Assistant Examiner.*